United States Patent [19]

Yerushalmi et al.

[11] 4,103,646
[45] Aug. 1, 1978

[54] APPARATUS AND METHOD FOR COMBUSTING CARBONACEOUS FUELS EMPLOYING IN TANDEM A FAST BED BOILER AND A SLOW BOILER

[75] Inventors: Joseph Yerushalmi, New York, N.Y.; Shelton Ehrlich, Palo Alto, Calif.; Mohammad Maaghoul, deceased, late of Sunnyvale, Calif., by Nassrine S. Maaghoul, administratrix; Terry E. Lund, Foster City, Calif.

[73] Assignee: Electric Power Research Institute, Inc., Palo Alto, Calif.

[21] Appl. No.: 775,656

[22] Filed: Mar. 7, 1977

[51] Int. Cl.² .................. F22B 1/02; F23D 19/00
[52] U.S. Cl. .................. 122/4 D; 110/263; 23/284;288 S
[58] Field of Search .............. 110/1 J, 28 J, 8 F; 122/4 D; 201/31; 48/203; 165/140

[56] References Cited

U.S. PATENT DOCUMENTS

| 2,498,088 | 2/1950 | Lewis et al. | 23/288 S |
|---|---|---|---|
| 2,700,592 | 1/1955 | Heath | 23/284 |
| 3,763,830 | 10/1973 | Robinson et al. | 110/28 |
| 3,840,353 | 10/1974 | Squires | 48/203 |
| 3,868,993 | 3/1975 | Battcock | 165/140 |
| 3,884,649 | 5/1975 | Matthews | 48/203 |
| 3,902,462 | 9/1975 | Bryers | 122/4 |
| 3,910,235 | 10/1975 | Highley | 122/4 |
| 4,026,679 | 5/1977 | Collin | 110/1 |

*Primary Examiner*—Kenneth W. Sprague
*Attorney, Agent, or Firm*—Townsend and Townsend

[57] ABSTRACT

A fluid bed boiler and combustion method are provided having a first fast bed combustion zone followed by a second slow bed combustion zone. Coal, as a typical fuel, and limestone are fed to the first zone, where the coal undergoes combustion and sulfur is captured by the limestone. The solids which flow from the top of the first combustion zone are separated and introduced into a low velocity "slow" bubbling fluid bed in which arrays of heat exchange tubes are immersed. Additional heat transfer to water can be achieved by employing water walls for the first fast bed combustion zone.

9 Claims, 1 Drawing Figure

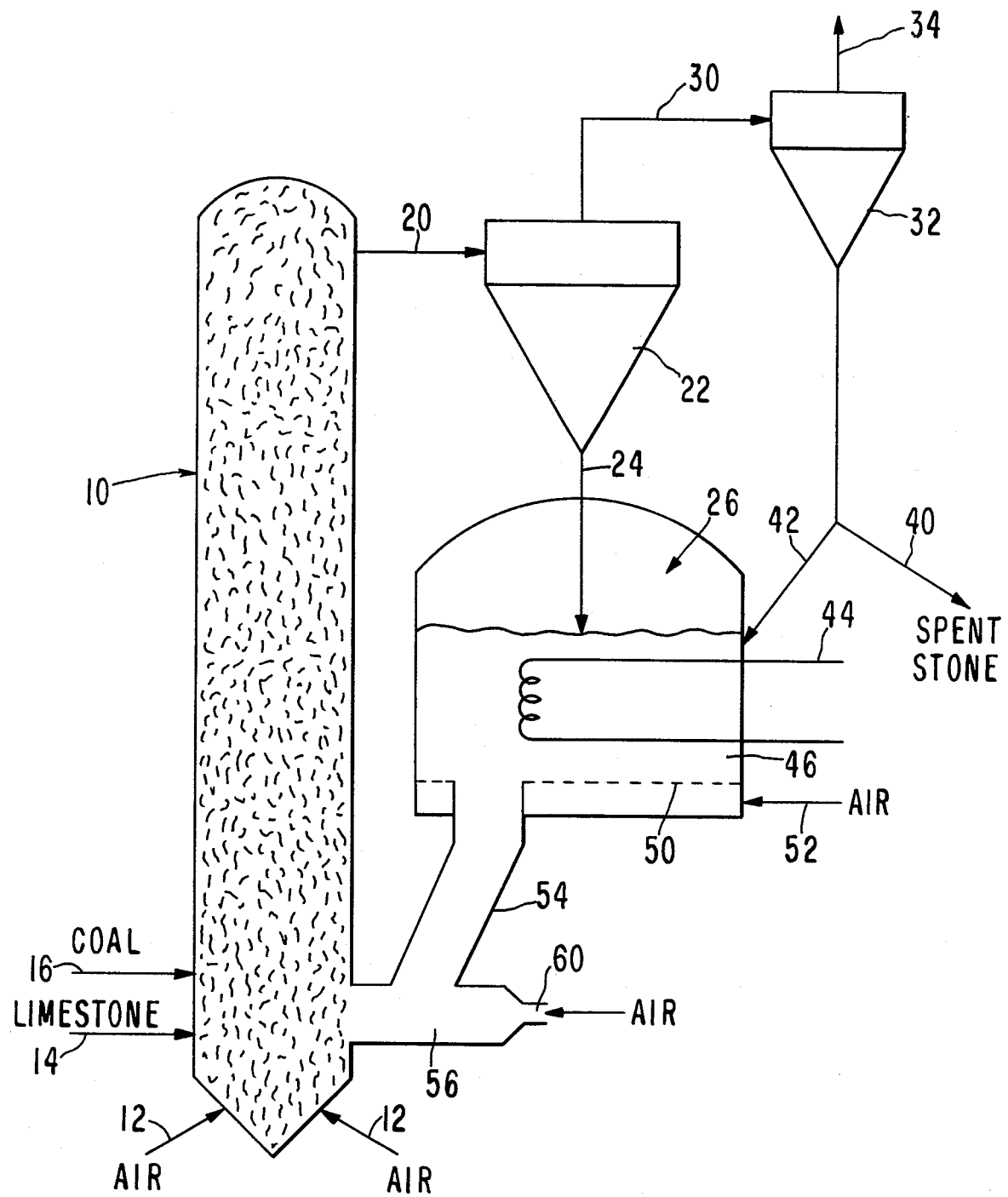

APPARATUS AND METHOD FOR COMBUSTING CARBONACEOUS FUELS EMPLOYING IN TANDEM A FAST BED BOILER AND A SLOW BOILER

This invention was made under contract with or supported by the Electric Power Research Institute.

BACKGROUND OF THE INVENTION

1. Field of the Invention

The conventional fluid bed boilers normally involve a shallow bed of coarse particles, either inert or sulfur-accepting stone, fluidized by air at a rate sufficient to bring about vigorous fluidization and provide efficient combustion. Arrays of heat exchange tubes are located within the bed in order to exploit the favorable heat transfer characteristics of fluidized beds.

The nature of the shallow bed and large particles which are employed create numerous engineering problems in developing a satisfactory design. The design should provide for uniform distribution of air as well as good solid mixing across the bottom of the bed. With coarse material, this inevitably means a distributor with a large number of holes per unit bed area (or its equivalent if actual holes are not used). The distributor should incur a minimal pressure drop compatible with its functions and should offer the promise of durability and minimum maintenance.

Not only must the air be uniformly distributed, more importantly there must be quick and uniform lateral distribution of the coal over the entire cross section of the bed. This requires feeding of the coal through a large number of inlets, and a complex system of fuel distribution.

Because of the need to maintain a temperature around 1500° F for optimum capture of sulfur, the conventional fluid boiler is poorly suited for following load. Reducing the air and coal rates would inevitably cause an appreciable drop in bed temperature with attendant loss of sulfur capture efficiency.

Furthermore, the conventional fluid boiler often gives rise to a substantial carryover of unburnt char. Combustion of some of this char in the freeboard above the bed, where the concentrations of sulfur-accepting stone and oxygen are low, results in escape of sulfur dioxide and carbon monoxide. For high carbon utilization, the carbon in the entrained dust and the carbon monoxide will require additional burn up zones for their consumption.

Calcium to sulfur ratios required to achieve the desired level of sulfur reduction are generally high. This is a consequence of the relatively poor contacting between gas and solid that the shallow bed of coarse particles affords. Finally, because of the relatively low coal processing throughput of the conventional fluid bed boiler - generally below 100 lbs of coal per hour per unit area of bed cross section - utility size installations may entail cumbersome and complex designs.

2. Description of the Prior Art

U.S. Pat. No. 2,498,088 describes a fast bed catalytic cracker. Fast fluidized beds are described in Reh, Chem. Eng. Progr. 67 (2), 58 (1971); and Yerushalimi, et. al., Ind. Engr. Chem. Process, Design and Development 51, 47 (1976). Multiple beds are described in Elliott, IMech E/VDI Joint Energy Convention, Dusseldorf, May 57, 1975.

Patents of interest employing multiple beds include U.S. Pat. Nos. 2,700,592, 3,763,830, 3,840,353, 3,868,993, 3,884,649, and 3,902,462.

SUMMARY OF THE INVENTION

A fluid bed boiler and combustion method are provided having two zones. In the first, coal and make-up limestone are fed to a fast bed of limestone fluidized by air at high velocities wherein the coal undergoes combustion and the bed of limestone provides for the capture of the sulfur dioxide which results from the oxidation of the sulfur in the coal. The solids exiting from the first zone are separated from the gases and flow into a "slow" bubbling bed fluidized by air at a relatively low velocity in which bed are immersed arrays of heat exchange tubes. Additional heat transfer can be provided by supplying the fast bed combustor with water walls. Solids from the slow bed are recirculated to the bottom of the fast bed.

The slow bed fulfills a number of functions in serving also as a solid reservoir and as a kind of stand pipe providing control and driving force for the circulation of the solid at a rate sufficient to establish the state of fast fluidization in the combustor.

BRIEF DESCRIPTION OF THE DRAWING

FIG. 1 is a diagramatic view of the fluid bed boiler according to this invention.

BRIEF DESCRIPTION OF THE SPECIFIC EMBODIMENTS

A fast fluid bed boiler is provided having a first fast fluidized combustion zone and a second slow bed fitted with an array of heat exchange tubes. The effluent from the fast zone is separated into solids and gaseous fractions, with the solids flowing into the slow zone. From the slow bed the solids flow to the bottom of the fast bed. The rate of flow may be controlled by an air stream or other suitable regulating means.

The limestone particles may be of a size as large as 0.5 in, usually less than 0.25 inch and more usually will be finely divided, smaller than 100 U.S. mesh, for example. Crushed limestone may also be used, a coarse fraction of which stone will settle and form a bubbling fluidized bed at the bottom of the first reactor, and the finer fractions of which will be entrained and circulated, via the slow bed, to form a fast fluidized bed in the upper portion of the first reactor. Disintegration of the coarse stone will contribute additional fines.

Inasmuch as the coal accounts only for a very small fraction of the solid inventory in the boiler (around 1 to 2 percent by weight), the choice of its size is not critical. Crushed coal normally of up to about 1.5 in., may be used, through pulverized coal may afford higher combustion efficiencies in the fast bed combustor. The upper size limit is primarily one of availability and convenience in handling.

The air fluidizing velocity will not usually exceed 35 ft per second, more usually not exceed 30 ft per second and generally range from about 20 to 30 feet per second.

The height of the fast bed combustor and the fluidized density within it should be chosen to achieve a minimum pressure drop compatible with high efficiencies of combustion and sulfur capture. The fluidized density may be lower tha 5 lbs per cubic feet, but probably not lower than 3 lbs/ft$^3$.

To insure efficient separation of the solids from the flue gas, two cyclone stages may be preferably employed. A large primary cyclone will serve for solid knockdown and be designed for low inlet gas velocities, generally in the range of 20 to 40 ft/sec. A secondary high efficiency cyclone would provide for complete or substantially complete removal of the solids from the flue gas.

In addition to the use of cyclones for solids separation, a vessel configuration may be employed which provides for solids disentrainment or spillover, prior to gas entering the cyclones. This system will reduce the solids' loading in the cyclones and may be the preferred system for solids separation.

The area of the slow bed is chosen to accommodate the quantity of air, given a specific fluidizing velocity, needed to burn char and unburnt coal arising from the fast bed combustor. The fluidizing velocity may lie in the range of 0.5 to 2 ft per second. The area as well as the height of the solid bed are also chosen to provide sufficient bed volume to accommodate the boiler tubes suitably spaced, and to ensure stable operation of the fast bed.

At a given gas velocity, the fluidized density of the fast bed will be dependent upon the circulation rate of the solid as well as the pressure driving force afforded by the heads of solid in the slow bed and in the transfer line leading from the slow to the fast bed.

For example, to establish a density of 5 lbs/ft$^3$ in a fast bed fluidized at 20 ft/sec will require a solid circulation rate in the neighborhood of 50 lbs per second per square foot of fast bed area.

The pressure in the combustion zones is not critical and the zones may be operated at pressures equal to, less than or greater than atmospheric pressure. However, the subject fluid bed boiler can be operated advantageously at pressures greater than atmospheric. Normally the pressure will be below about 20 atm, more usually below about 10 atm, and preferably from about 2 to 5 atm.

For further understanding of this invention, the drawings will now be considered. A fast bed combustor 10, through which a solid comprising mostly limestone is circulated is provided with inlets for air 12, make-up limestone 14 and coal 16. The coal undergoes combustion and the released sulfur dioxide is captured by the limestone in the fast bed. The effluent from the combustor 10 exits through conduit 20 into primary cyclone 22. The primary cyclone provides for a substantial removal of the solids from the effluent, with the solids flowing down through conduit 24 into slow bed 26. Unseparated fines and the effluent gas flow from the primary cyclone 22 via conduit 30 to secondary cyclone 32, from which the hot gases exit through conduit 34 for further heat recovery, while the solids flow through conduit 36 and are separated into two streams, of which one is returned to the slow bed 26 via conduit 42, and the other, representing a limestone purge, is withdrawn from the system through conduit 40.

The slow bed 26 contains an array of heat exchange tubes 44 covered by the fluidized solid 46. An air distributor 50 is provided in the lower portion of the slow bed 26, air being introduced by means of conduit 52. From the slow bed, the solid, comprising mostly limestone reacted to varying degrees, flows downwardly through transfer line 54 into pipe 56 which has air inlet 60. The rate at which the solids flow from the slow bed to the fast bed is controlled by the rate of air introduced through air inlet 60.

The subject fluid bed boiler has a number of advantages and desirable features. The presence of fine limestone and the superior contacting between gas and solid in the fast fluidized bed provide requisite levels of sulfur reduction at relatively low calcium/sulfur ratios. The absence of free board in the fast bed combustor precludes the presence of combustion area where there is insufficient amounts of limestone to capture the sulfur dioxide which is produced.

The superior gas-solid mixing and gas-gas mixing in the fast fluidized bed also provide higher combustion efficiencies.

The subject fluidized bed boiler provides a good capability for following changes in load. With the boiler operating at full capacity, turn down can simply be achieved by reducing the rates of flow of air and fuel in the required proportions, and cutting down on the solid circulation rate. The temperature in the fast bed combustor would remain the same ensuring efficient capture of sulfur, whereas the temperature in the slow bed would drop. It should also be noted that a reduction in the solid rate accompanying a reduction in the fluidizing air velocity will tend to maintain the fluidized density in the fast bed essentially constant.

In order to ensure satisfactory air distribution and minimize the pressure drop, air could readily be distributed from a number of tuyeres spaced around the periphery at the bottom of the combustor. The feeding of coal and limestone can also be accomplished through a small number of inlet ports. The high solid mixing in the fast bed would promote uniform distribution of the coal in the bed, while the large effective height of the fast bed would correct for any maldistribution of coal occurring at the bottom of the bed. In addition, since the slow bed comprises only fine particles, the design of a distributor for this bed presents no problems.

A further advantage is that the fast bed boiler requires less heat exchange surface. Heat transfer coefficients between a fluidized bed and immersed surfaces are strongly dependent upon particle size. In a bed of fine solids, a typical coefficient of heat transfer could lie near 100 Btu/hr-ft$^2$-F°; in a bed of coarse particles, the heat transfer coefficient might be around 40, as is experienced in conventional fluid bed boilers. Since the subject invention involves a slow bed comprising mostly or wholly fine particles, the heat exchange surface employed would be about half that used in the conventional fluid bed boiler.

The fluid bed boiler of the subject invention can be used to provide process steam or steam for turbine for electricity generation. The fuel for the fast bed will normally be high-sulfur coal, but can be any liquid, solid or gaseous carbonaceous fuel, including high-sulfur oil, residues and bottoms from coal liquifaction processes, rejects from coal cleaning processes, unreacted char from processes which gasify or hydrocarbonize coal, petroleum coke and combustible refuse.

Although the foregoing invention has been described in some detail by way of illustration and example for purposes of clarity of understanding, it will be obvious that certain changes and modifications may be practiced within the scope of the appended claims.

What is claimed:

1. A method for operating a fluid bed boiler which comprises:
    in a first combustion zone, fluidizing with air under fast bed conditions limestone and carbonaceous fuel, whereby a portion of said limestone and fuel are spent to provide a solid-gas mixture effluent; transferring said solid-gas mixture effluent to a separation zone and separating solids from gases;

transferring said solids from separation zone to a second combustion zone, and fluidizing in said second combustion zone said solids with air under slow bed conditions, wherein unspent fuel from said first combustion zone is consumed; said second combustion zone having heat exchange tubes in heat exchanging relationship with said slow bed; and circulating a major portion of solids exiting from said second combustion zone to said first combustion zone.

2. A method according to claim 1, wherein said separating zone comprises: in a first separation zone, separating at a low inlet gas velocity and relatively low pressure and in a second separation zone, removing any remaining solids in the effluent from said first separation zone.

3. A method according to claim 2, wherein said transferring from said second combustion zone to said first combustion zone of unspent fuel and limestone employs an air stream.

4. A method according to claim 1, wherein said fuel is coal of a mesh size of less than about 40, said limestone is of a mesh size less than about 100, the velocity of said air in said first combustion zone is less than about 35 ft per second and the velocity of said air in said second combustion zone is less than about 2 ft per second.

5. A method according to claim 1, wherein the pressures in said combustion zone are superatmospheric.

6. A method according to claim 5, wherein said pressures are in the range of 2 to 10 atm.

7. A tandem fluid bed boiler comprising:

a fast bed combustor having an elongated tower with entry means in a lower portion of said tower for introducing carbonaceous fuel, limestone and air at a rate to provide a fast fluidized bed and exit means in an upper portion of said tower for exiting solids and gases;

gas-solid separation means in communication with said fast bed combustor exiting means;

a slow bed combustor having first entry means connected to said separation means for receiving solids from said separation means; second entry means for introducing air to maintain a flow fluidized bed; and heat exchange tubes situated in heat exchange relationship with said slow fluidized bed; and conduit means connecting a lower portion of said slow bed combustor with a lower portion of said fast bed combustor for transferring solids, said conduit means having air entry means.

8. A tandem fluid bed boiler according to claim 7, wherein said separation means comprises a first cyclone separator operable at low inlet gas velocities and low pressure drops and a second cyclone separator communicating with said first cyclone separator.

9. A tandem fluid bed boiler according to claim 8, wherein said slow bed combustor has an air distributor in a lower portion of said combustor.

* * * * *